United States Patent
Zook et al.

(10) Patent No.: US 6,486,268 B2
(45) Date of Patent: Nov. 26, 2002

(54) SEALANTS CONTAINING MULTIMODAL POLYMER BLENDS

(75) Inventors: Jonathan D. Zook, San Clarita, CA (US); David W. Jordan, Northridge, CA (US); Dean M. Willard, New York, NY (US); George Jones, Tustin, CA (US); Michael Cosman, Irvine, CA (US)

(73) Assignee: PBT Brands, Inc., Santa Clarita, CA (US)

( * ) Notice: Subject to any disclaimer, the term of this patent is extended or adjusted under 35 U.S.C. 154(b) by 0 days.

(21) Appl. No.: 09/802,336

(22) Filed: Mar. 9, 2001

(65) Prior Publication Data

US 2002/0013428 A1 Jan. 31, 2002

(Under 37 CFR 1.47)

Related U.S. Application Data

(60) Provisional application No. 60/188,038, filed on Mar. 9, 2000.

(51) Int. Cl.⁷ ............................................. C08G 75/00
(52) U.S. Cl. ..................... 525/535; 528/373; 528/374; 528/378
(58) Field of Search ........................ 525/535; 528/373, 528/374, 378

(56) References Cited

U.S. PATENT DOCUMENTS

| | | | |
|---|---|---|---|
| 3,659,896 A | 5/1972 | Smith et al. | 296/93 |
| 4,017,554 A | 4/1977 | Villa | 260/830 S |
| 4,366,307 A | 12/1982 | Singh et al. | 528/373 |
| 4,425,389 A | 1/1984 | Schollhorn et al. | 428/34 |
| 4,607,078 A | 8/1986 | Dergazarian | 525/64 |
| 4,609,762 A | 9/1986 | Morris et al. | 568/38 |
| 4,786,697 A | 11/1988 | Cozewith et al. | 526/88 |
| 5,225,472 A | 7/1993 | Cameron et al. | 524/368 |
| 5,612,402 A | 3/1997 | Orecharova et al. | 524/437 |
| 5,670,601 A | 9/1997 | Allen et al. | 528/76 |
| 5,843,357 A | 12/1998 | Seneker et al. | 264/204 |
| 5,912,319 A | 6/1999 | Zook et al. | 528/373 |
| 5,959,071 A | 9/1999 | DeMoss et al. | 528/378 |
| 6,069,211 A | 5/2000 | Reyes, Jr. et al. | 525/523 |
| 6,072,014 A | 6/2000 | Wilson, Jr. | 526/352 |
| 6,172,179 B1 | 1/2001 | Zook et al. | 528/373 |
| 6,232,401 B1 | 5/2001 | Zook et al. | 525/191 |

*Primary Examiner*—Duc Truong
(74) *Attorney, Agent, or Firm*—Gifford, Krass, Groh, Sprinkle, Anderson & Citkowski, P.C.

(57) ABSTRACT

A blend of multimodal average molecular weight sulfur or ether linkage containing organic polymers provides sealants, potting compounds and moldable compositions with good physical properties. In the case of S-containing polythioether or polysulfide, these properties are well suited to the formulation of aerospace sealants even using standard lightweight filler technology. Sealants based upon this multimodal blend concept exhibit improved strength and toughness even when relatively large amounts of lightweight fillers are used. Multimodal polyurethanes and other ether linkage containing polymers also show enhanced physical properties.

27 Claims, No Drawings

SEALANTS CONTAINING MULTIMODAL POLYMER BLENDS

RELATED APPLICATION

This application claims priority of United States Provisional Patent Application 60/188,038 filed Mar. 9, 2000, and is incorporated herein by reference.

FIELD OF THE INVENTION

The present invention relates generally to sealants and, in particular, to sealants containing multimodal polymer blends operative in a variety of environments including aerospace.

BACKGROUND OF THE INVENTION

Aviation fuel resistant sealants are widely used by the aircraft industry for many purposes. Principal among these uses are the sealing of integral fuel tanks and cavities, the sealing of the passenger cabin to maintain pressurization at high altitude, and the aerodynamic smoothing of the aircraft's outer surfaces. Today's aircraft design criteria specify that sealants must be light in weight but still maintain the strength and toughness of older high-density sealants. Sealant manufacturers have responded by producing lower density polymers, e.g., the polythioether polymers described in U.S. Pat. Nos. 4,366,307 and 5,912,319, or by the incorporation of lightweight fillers as described in U.S. Pat. No. 5,663,219. Unfortunately, utilizing either of these approaches to obtain lightweight sealants results in compromised properties.

Substituting polythioether polymers (typical specific gravity (s.g.) of about 1.16) for the heavier polysulfide polymers (typically s.g. of about 1.27) results only in a modest reduction in sealant weight. Incorporating lightweight organic or inorganic fillers into a sealant can lower the sealant's specific gravity to near 1.0. Unfortunately, the addition of only a few percent of these fillers dramatically reduces the strength and toughness of the sealant, especially after immersion in aviation fuel.

U.S. Pat. No. 5,985,997 discloses the utility of bimodal polymer distributions in obtaining high impact strength and good gloss in polystyrene polymers. U.S. Pat. No. 5,905,131 discloses multimodal siloxane based formulations having improved strength without added fillers. There are also numerous references to the use of biomodal polymer blends to achieve enhanced emulsification properties in waterborne latexes. U.S. Pat. No. 5,670,601 discloses polyol dispersity in forming polyurethanes.

Unfilled systems suggested by Madkour and Mark in *Polymer Bulletin* 31, 615–621, 1994 and in *Macromolecular Reports* A31, 153–160, 1994 include what are referred to as bimodal systems, in which a mixture of functionally-terminated polydimethyl siloxanes were used and end-linked. Trimodal systems were also prepared and tested (using three specified different molecular weight siloxane polymers), but the authors found that although changing from a unimodal distribution to a bimodal distribution significantly improves mechanical properties, changing from a bimodal distribution to a trimodal distribution does not give a further improvement in properties and may actually be detrimental.

In aerospace sealant applications, it is important that polythioether materials are provided which have a good mechanical strength, but which do not have a high viscosity prior to curing. Lightweight systems have been provided which have a relatively low viscosity before curing, but they tend to use organic solvents to reduce the inherent viscosity of lightweight filler-containing compositions. Solvent evaporation during curing leads to materials that dimensionally shrink after application, a highly undesirable property in aerospace sealants. There is a need to provide lightweight compositions that achieve a low viscosity prior to curing to an elastomer form, without the use of organic solvents, yet retain good mechanical properties.

SUMMARY OF THE INVENTION

A composition includes a multimodal polymer blend containing sulfur or ether linkages therein. The multimodal polymer blend has a ratio of between 2 and 4.5 for a maximal polymer mode average molecular weight and a minimal polymer mode average molecular weight, where the minimum polymer mode average molecular weight is less than 1000 Daltons.

In another embodiment, a composition includes a multimodal sulfur containing polymer blend having an average molecular weight modal ratio between maximum and minimum modes of greater than 1.5.

A process for preparing multimodal polymer composition blends of sulfur or ether linkage containing polymers includes blending a plurality of such polymer constituents, each constituent having a modal distribution of average molecular weights and curing the plurality of polymers. The ratio of maximal average molecular weight mode to minimal average molecular weight mode of greater than 1.5. The product obtained from such a process affords superior physical properties. A commercial package is contemplated having a premixed blend of multimodal sulfur or ether linkage containing polymer constituents.

DETAILED DESCRIPTION OF THE INVENTION

The invention relates to elastomer-forming multimodal compositions. More specifically, the invention relates to various sulfur-containing and ether linkage containing organic polymers. Polythioether-based elastomer-forming compositions which are substantially free from organic solvents and which show improved strength when used, for example, to formulate lightweight aerospace sealants. Polysulfide compositions that are polymodal are operative in applications illustratively including aerospace, sealants, and potting compounds.

Multimodal ether linkage containing compositions upon cure demonstrate superior physical properties. Ether linkage containing polymers according to the present invention illustratively include polyurethanes, polyethers, and polyesters.

As used herein "multimodal" is defined to mean at least a bimodal distribution in molecular weight wherein the ratio average polymer molecular weight (MWn) of the maximum mode to the average polymer molecular weight of the minimum mode is greater than 1.5. Thus, in the simplest multimodal distribution, a bimodal distribution, one mode corresponds to the maximum mode and the second mode corresponds to the minimum mode.

The invention involves blending two or more sulfur or ether linkage containing organic polymers. While it is appreciated that polythioether polymers are preferred in aerospace applications owing to the low density, high strength and high fuel resistivity, it is recognized that polysulfides and multiple ether linkage containing polymers are well suited for a variety of applications known to the art. Polymers operative herein are illustratively terminated with thiol, olefin, epoxide, hydroxyl, silyl, siloxo, cyano, isocyano, amino and mixtures thereof. Preferably, polythioethers are thiol terminated and polysulfides are thiol terminated. Surprisingly, the multimodal blends of various sulfur or ether linkage containing organic polymers result in sealants having exceptionally good physical properties. These properties are well suited to the formulation of sealants even using standard lightweight filler technology. Sealants based upon this multimodal blend concept exhibit surprisingly improved strength and toughness even when relatively large amounts of lightweight fillers are used. Lightweight fillers according to the present invention illustratively include hollow glass forms, aerogels, polymeric beads and the like. Thus, sulfur-containing sealants with lower specific gravity are provided having physical properties that are the same or better than conventional aerospace sealants, even after exposure to aviation fuels.

Multimodal polymer blends exhibit discemable multimodal molecular weight distributions when examined by gel permeation chromatography. While the multimodal ratio according to the present invention is greater than 1.5, it has surprisingly been found that the superior properties are achieved for a material specific range of multimodal ratios. Thus, in a preferred embodiment the multimodal ratio for polythioethers is generally between about 2 and 3, for polysulfides generally between about 3 and 4, and for ether linkage containing polymers between about 2 and 4.5. Factors relevant to determining the multimodal ratio include, but are not limited to, maximum mode viscosity, presence and nature of pendant groups, and glass transition temperature.

A variety of ether linkage containing polymers are formed through linkages made between reactive groups and organic hydroxyl groups. In order to form a polymer, the hydroxyl group containing compounds are necessarily at least bifunctional. A particularly important group of ether linkage containing polymers are polyurethanes in which the reactive group RNCO is reacted with a polyol. In order to maintain polymeric chain extension, di- or poly-isocyanates, preferably di-isocyanates, are reacted with polyoxyalkylene polyether polyols which are preferably diols in order to induce chain extension. The present invention affords high strength ether linkage containing polymers and in particular polyurethanes through the use of a multimodal distribution of polyol prepolymers. A variety of polyols are operative herein in the preparation of ether linkage containing polymers, the extent of these polyols is described in the *Polyurethane Handbook,* Chapter 3. These polyols illustratively include aliphatic glycols, dihydroxy aromatics, such as bisphenols, and hydroxy terminated ethers and polyesters. The formation of polyols operative herein are well known to the art and typically the reactions afford a distribution in molecular weights. While considerable effort has previously been expended in minimizing molecular weight distribution, the present invention blends disparate average molecular weight polyol distributions in order to form polymers having different properties than monomodal polyol distributions. Hydroxy terminated polyoxyalkylenes are particularly preferred in forming ether linkage containing polymers. Hydroxy terminated polyoxyalkylenes are typically prepared by base catalyzed addition of alkylene oxide to at least a dihydric compound. Dihydric compounds illustratively include ethylene glycol, terminal alkane diols, bisphenols, hydroquinones and the like. Similar trihydric and tetrahydric compounds are also known to the art. According to the present invention, polyols are utilized having a multimodal ratio of between 2 and 4.5, with the average mean molecular weight of the minimal mode being less than 1000 Daltons. Preferably, the minimal mode average molecular weight is about 850 Daltons±100 Daltons.

Sulfur-containing multimodal compositions most useful in the context of aerospace sealants generally have a majority of the higher molecular weight mode polymer. In one embodiment, no greater than 90 weight percent of the composition is high mode polymer distribution. For aerospace sealants, the range of preferable blends have 60 to 80 weight percent of high molecular weight mode component. It is to be appreciated that useful compositions may exist where the majority species is the lower molecular weight components, hence, these compositions are not meant to limit the utility of this invention. Similarly, ether linkage containing polymer blends preferably have a majority of higher molecular weight mode polymers, yet it is appreciated that minority amounts of highest molecular weight mode polymers also afford useful and often lower viscosity compositions.

Polythioether polymers useful in the context of this invention are numerous and include, but are not limited to, those described in U.S. Pat. Nos. 4,366,307; 5,912,319; 5,959,071 and in the references contained therein. Useful polysulfide polymers include, but are not limited to, any of the commercially available dichlorodiethylformal based polysulfides such as those sold by Morton International of Chicago, Ill. under the trade name LP® liquid polysulfide.

The following examples demonstrate the significant and surprising utility of a multimodal polymer blend according to the invention. Instead, the examples set forth representations of the surprisingly improved properties according to the present invention.

Example 1

Table I sets forth various sulfur-containing polymers suitable for use in one embodiment of compositions of the invention useful, for example, as an aerospace sealant. It is to be appreciated that the composition or method of the invention is not limited to a composition comprising some combination of these seven polymers.

TABLE I

| | |
|---|---|
| Polymer A | Polythioether made according to the method described in Example 1 of U.S. Pat. No. 5,912,319. The composition was adjusted so that a number average molecular weight of 4500 Daltons was obtained. |
| Polymer B | Polythioether made according to the method described in Example 1 of U.S. Pat. No. 5,912,319. The composition was adjusted so that a number average molecular weight of 2000 Daltons was obtained. |
| Polymer C | Polythioether made according to the method described in Example 1 of U.S. Pat. No. 5,912,319. The composition was adjusted so that a number average molecular weight of 500 Daltons was obtained. |
| Polymer D | Polythioether made according to the method described in Example 16 of U.S. Pat. No. 4,366,307. The composition was adjusted so that a number average molecular weight of 5000 Daltons was obtained. |
| Polymer E | Polythioether made according to the method described in Example 16 of U.S. Pat. No. 4,366,307. The composition was adjusted so that a |

TABLE I-continued

| | |
|---|---|
| | number average molecular weight of 1000 Daltons was obtained. |
| Monomer F | Dimercaptodiethylsulfide (DMDS) |
| Monomer G | Dimercaptodioxaoctane (DMDO) |

According to this example, the representative polymers and monomers set forth in Table I are formulated, cured, and tested according to industry standard protocols. In all cases the ingredients are combined, one at a time, while mixing on, for example, a Ross Powermixer. Each ingredient is thoroughly mixed and wetted-in prior to addition of the next ingredient.

Table II sets forth various mixtures of the seven polymers/monomers listed in Table I as well as the properties of the uncured composition.

TABLE II

| | Parts by weight in formulation number | | | | | | | |
|---|---|---|---|---|---|---|---|---|
| Ingredient | 1 | 2 | 3 | 4 | 5 | 6 | 7 | 8 |
| Polymer A | 100 | 70 | 60 | | | | 90 | 85 |
| Polymer B | | 30 | 30 | | | | | |
| Polymer C | | | 10 | | | | | |
| Polymer D | | | | 100 | 60 | | | 90 |
| Polymer E | | | | | 40 | | | |
| Monomer F | | | | | | 10 | | 10 |
| Monomer G | | | | | | | 15 | |
| Phenolic Adhesion Promoter | 5 | 5 | 5 | 5 | 5 | 5 | 5 | 5 |
| Calcium Carbonate | 20 | 20 | 20 | 20 | 20 | 20 | 20 | 20 |
| Strontium Chromate | 7.5 | 7.5 | 7.5 | 7.5 | 7.5 | 7.5 | 7.5 | 7.5 |
| Lightweight Filler | 10 | 10 | 10 | 10 | 10 | 10 | 10 | 10 |
| Catalyst, DABCO (triethylene diamine) | 1 | 1 | 1 | 1 | 1 | 1 | 1 | 1 |
| Properties of the uncured sealant | | | | | | | | |
| Viscosity, poise | 12,000 | 9,000 | 7,000 | 11,000 | 8,500 | 7,000 | 5,500 | 5,500 |
| Numerical ratio of MWn | n/a | 2.25 | 9.00 | n/a | 5.00 | 29.0 | 25.0 | 32.5 |
| Gel Time, minutes | 62 | 70 | 93 | 70 | 90 | 101 | 124 | 110 |

Curing of the eight mixtures illustrated in Table II was accomplished by intimately mixing a stoichiometric quantity (thiol mixture:epoxy ratio of 0.9–1.1) of the following curing agent.

| Ingredient | Parts by weight use |
|---|---|
| Dow Epoxy Novolac | 75 |
| Shell Epon 828 | 5 |
| Carbon black | 25 |

This blend of "thiol mixture" and "curing agent" is mixed by hand until a homogenous gray mixture, containing no black or white striations, is obtained. The mixture is allowed to cure at ambient conditions for seven days followed by 24 hours at 120° F. Immersion testing consisted of seven days immersion at 140° F. in Jet Reference Fluid (JRF) type I. Following immersion, the samples are dried with a clean towel and allowed to equilibrate to ambient temperature before testing. Table III summarizes the surprisingly improved performance obtained using the inventive compositions:

TABLE III

| | Formulated Sealant Properties | | | | |
|---|---|---|---|---|---|
| Formulation | Short A hardness | Peel strength before immersion, lbs/inch width | Peel strength after immersion, lbs/inch width | Adhesion to test panel before and after immersion | Specific Gravity |
| 1 | 51 | 40 | 21 | 100%/100% | 1.02 |
| 2 | 57 | 61 | 42 | 100%/100% | 1.03 |
| 3 | 59 | 65 | 45 | 100%/100% | 1.05 |
| 4 | 42 | 35 | 17 | 100%/100% | 1.01 |
| 5 | 45 | 45 | 25 | 100%/100% | 1.03 |
| 6 | 45 | 49 | 30 | 100%/100% | 1.08 |
| 7 | 50 | 51 | 35 | 100%/100% | 1.09 |
| 8 | 52 | 47 | 29 | 100%/100% | 1.08 |

Table III indicates, in all cases, the multimodal polymer blends result in higher hardness and peel strength. Further, the uncured multimodal blend sealants have noticeably lower viscosity making them easier to apply. Peel strength after immersion in aviation fuel is also increased.

In one embodiment, aerospace sealants based upon multimodal blends of sulfur-containing polymers are disclosed. Sulfur-containing polymers include polythioethers prepared via condensation or addition reactions as well as polysulfide polymers prepared via condensation reaction between dichlorodiethylformal and sodium polysulfide. The polymers will have a reactive moiety at the terminal of each polymer chain. Preferred reactive moieties include —SH, —OH, $NH_2$, NHR, epoxy, isocyanate, or any of a number of ambient temperature cross-linking chemistries. Preferred molecular weights range from 150–10,000 Daltons with the most preferable range being 1000–6000. The number of reactive terminals per polymer molecule (functionality) must be at least two but can be as many as four. The most desirable range of functionality is 2 to 3. For multimodal blends the numerical ratio of the two polymers' MWn will be greater than 1.5.

Comparative Polysulfide Sealant Composition Examples

In following Examples 2–4:

Liquid polysulfide polymer A-4000 molecular weight, available from Rohm & Haas

Liquid polysulfide polymer B-1000 molecular weight, available from Rohm & Haas

The manganese dioxide curing paste dispersion is prepared by combining 55 parts by weight of Shepard Type II manganese dioxide powder, 44 parts by weight of HB-40 partially hydrogenated terphenyl plasticizer and 1 part by weight of tetramethylguanidene (TMG). Complete dispersion of this mixture is achieved using a three-roll paint mill.

Example 2

Sealant compositions are compounded using the following compositions (amounts are in parts by weight):

| Sealant 9 (non-multimodal) | |
| --- | --- |
| Liquid polysulfide polymer A | 100.0 |
| Calcium carbonate, precipitated (SOCAL ®, Solvay S. A.) | 22.5 |
| Dualite ® Beads, 6032AE (Pierce & Stevens) | 4.0 |
| Phenolic resin, Durez ® (Oxychem) | 1.3 |
| Fumed silica, Cab-O-Sil ® (Cabot Corporation) | 1.0 |
| Silane adhesion promoter, A-187 (OSI-Witco) | 1.0 |

| Sealant 10 (multimodal) | |
| --- | --- |
| Liquid polysulfide polymer A | 75.0 |
| Liquid polysulfide polymer B | 25.0 |
| Calcium carbonate, precipitated | 22.5 |
| Dualite ® Beads, 6032AE | 4.0 |
| Phenolic resin, Durez ® | 1.3 |
| Fumed silica, Cab-O-Sil ® | 1.0 |
| Silane adhesion promoter, A-187 | 1.0 |

The compounded sealant is mixed intimately with manganese dioxide curing paste dispersion in the weight ratio of 10:1 and cured at ambient temperature and humidity. The following physical properties are obtained for the cured compositions:

|  | Sealant 9 | Sealant 10 |
| --- | --- | --- |
| Ratio of MWn | 1 | 4 |
| Specific gravity | 1.12 | 1.12 |
| Viscosity, poise @ 25° C. | 14,000 | 10,800 |
| Peel strength, piw | 23 | 35 |
| Peel strength, piw after immersion in jet reference fuel | 18 | 25 |
| Extrusion rate, grams/min. @ 40 psi, 0.125" nozzle | 70 | 150 |
| Sealant consistency | Thick, slightly runny | Extremely shear thinning, high thixotropic index |

Example 3

Sealant compositions are compounded using the following compositions (amounts are in parts by weight):

| Sealant 11 (non-multimodal) | |
| --- | --- |
| Liquid polysulfide polymer A | 100.0 |
| Calcium carbonate, precipitated | 30.0 |
| Calcium carbonate, coarse (Hubercarb ®, J. M. Huber) | 10.0 |
| Phenolic resin, Durez ® | 2.0 |
| Strontium Chromate (Wayne Pigment) | 10.0 |
| Silane adhesion promoter, A-187 | 1.0 |

| Sealant 12 (multimodal) | |
| --- | --- |
| Liquid polysulfide polymer A | 80.0 |
| Liquid polysulfide polymer B | 20.0 |
| Calcium carbonate, precipitated | 30.0 |
| Calcium carbonate, coarse | 10.0 |

| Sealant 12 (multimodal) | |
| --- | --- |
| Phenolic resin, Durez ® | 2.0 |
| Strontium Chromate | 10.0 |
| Silane adhesion promoter, A-187 | 1.0 |

The compounded sealant is mixed intimately with manganese dioxide curing paste dispersion in the weight ratio of 10:1 and cured at ambient temperature and humidity. The following physical properties are obtained for the cured compositions:

|  | Sealant 11 | Sealant 12 |
| --- | --- | --- |
| Ratio of MWn | 1 | 4 |
| Specific gravity | 1.55 | 1.55 |
| Viscosity, poise @ 25° C. | 8,800 | 6,200 |
| Peel strength, piw | 20 | 38 |
| Peel strength, piw after immersion in jet reference fuel | 15 | 28 |
| Extrusion rate, grams/min. @ 40 psi, 0.125" nozzle | 30 | 55 |
| Sealant consistency | Heavy, runny | Very shear thinning, high thixotropic index |

Example 4

Sealant compositions are compounded using the following compositions (amounts are in parts by weight):

| Sealant 13 (non-multimodal) | |
| --- | --- |
| Liquid polysulfide polymer A | 100.0 |
| Calcium carbonate, precipitated | 22.5 |
| Phenolic resin, Durez ® | 1.3 |
| Fumed silica, Cab-O-Sil ® | 1.3 |
| Silane adhesion promoter, A-187 | 1.0 |

| Sealant 14 (multimodal) | |
| --- | --- |
| Liquid polysulfide polymer A | 95.0 |
| Liquid polysulfide polymer B | 5.0 |
| Calcium carbonate, precipitated | 22.5 |
| Phenolic resin, Durez ® | 1.3 |
| Fumed silica, Cab-O-Si1 ® | 1.3 |
| Silane adhesion promoter, A-187 | 1.0 |

The compounded sealant is mixed intimately with manganese dioxide curing paste dispersion in the weight ratio of 10:1 and cured at ambient temperature and humidity. The following physical properties are obtained for the cured compositions:

|  | Sealant 13 | Sealant 14 |
| --- | --- | --- |
| Ratio of MWn | 1 | 4 |
| Specific gravity | 1.40 | 1.40 |
| Viscosity, poise @ 25° C. | 13,000 | 8,800 |
| Peel strength, piw | 25 | 30 |

| | Sealant 13 | Sealant 14 |
|---|---|---|
| Peel strength, piw after immersion in jet reference fuel | 24 | 28 |
| Extrusion rate, grams/min. @ 40 psi, 0.125" nozzle | 45 | 85 |
| Sealant consistency | Thick, viscous | Creamy, shear thinning |

Example 5

Two 6% NCO terminated prepolymers are prepared from 850 and 4000 Dalton diols prepared with double metal cyanide glyme catalysts as per U.S. Pat. No. 5,670,601. The 4000 Dalton prepolymer is mixed in a formulation at 70 parts by weight with 30 parts by weight of 850 Dalton prepolymer along with 20 parts by weight calcium carbonate, 7.5 parts by weight strontium chromate, 10 parts by weight lightweight filler, and 0.1 parts by weight dibutyl tin dilaurate is used as a catalyst. 1,6-hexanediol is then added and the mixture brought to 70° C. to cure.

As a comparison 100 parts by weight of 4000 Dalton average molecular weight prepolymer is cured in the presence of the same amounts of fillers and catalysts. The multimodal polyurethane possessed a lower viscosity, greater gel time and increased elongation and tensile strength similar to the percentage changes observed in Example 2.

All patents and publications disclosed herein are hereby incorporated by reference to the same extent as if each individual patent or publication was explicitly and individually incorporated herein by reference.

While the multimodal polymers of the present invention have been described in use primarily as an aerospace sealant, it is understood that the present invention also has utility in formulating molding compounds, potting compounds, sealing compounds for thermopane and windshield glasses and the like. Modifications to the identity and multimodal distribution of polymers will be readily apparent to one skilled in the art upon reading the above specification without departing from the spirit thereof. It is intended that such modifications and all equivalents thereof fall within the scope of the appended claims.

What is claimed is:

1. A composition comprising a multimodal polymer blend containing sulfur or ether linkages therein, said polymer blend having a ratio of between 2 and 4 for a maximal polymer mode average molecular weight and a minimal polymer mode average molecular weight wherein the minimum polymer mode average molecular weight is less than 1000 Daltons.

2. The composition of claim 1 wherein said multimodal blend is a bimodal blend.

3. The composition of claim 1 wherein the maximal polymer mode average molecular weight component is a weight percent majority constituent of said blend.

4. The composition of claim 1 wherein the maximal polymer mode average molecular weight is between 1000 and 6000 Daltons.

5. The composition of claim 1 wherein said blend comprises polythioethers.

6. The composition of claim 1 wherein said blend comprises polysulfides.

7. The composition of claim 1 wherein said blend comprises a mixture of polythioethers and polysulfides.

8. The composition of claim 1 wherein said blend comprises an ether linkage containing polymer selected from the group consisting of: polyurethanes, polyethers and polyesters.

9. A composition comprising a multimodal sulfur containing polymer blend, said blend having a ratio of greater than 1.5 for a maximal polymer mode average molecular weight and a minimal polymer mode average molecular weight.

10. The composition of claim 9 wherein said blend comprises polythioethers.

11. The composition of claim 9 wherein said blend comprises polysulfides.

12. The composition of claim 9 wherein said blend is a mixture of polythioethers and polysulfides.

13. The composition of claim 9 wherein said blend comprises a sulfur containing polymer having at least two reactive moieties, each reactive moiety independently selected from the group consisting of: mercapto, hydroxyl, primary amino, secondary amino, epoxy, and isocyano.

14. The composition of claim 13 wherein said sulfur containing polymer is bifunctional.

15. The composition of claim 13 wherein said sulfur containing polymer is polyfunctional.

16. The composition of claim 9 wherein the maximal polymer mode average molecular weight component is a weight percent majority constituent of said blend.

17. The composition of claim 16 wherein the maximal polymer mode average molecular weight constituent is greater than 60 weight percent of said blend.

18. The composition of claim 17 wherein the maximal polymer mode average molecular weight constituent is from 60 to 80 weight percent of said blend.

19. The composition of claim 9 wherein the maximal polymer mode average molecular weight is between 150 and 10,000 Daltons.

20. The composition of claim 9 wherein the maximal polymer mode average molecular weight is between 1000 and 6000 Daltons.

21. A process for preparing a composition of claim 1 which comprises:
    blending a plurality of polymer constituents, each having a modal distribution of average molecular weights; and
    curing said plurality of polymer constituents.

22. The process of claim 21 wherein said plurality of polymer constituents are sulfur containing polymers.

23. The process of claim 22 wherein curing said plurality of polymers occurs with an amine as a curing catalyst.

24. A product obtained by the process of claim 21.

25. A commercial package comprising a composition according to claim 1 together with instructions for the use thereof as an aerospace sealant.

26. A composition comprising a multimodal polymer blend containing sulfur or ether linkages therein, said polymer blend having a ratio of between 2 and 4 for a maximal polymer mode average molecular weight and a minimal polymer mode average molecular weight wherein the minimum polymer mode average molecular weight is less than 1000 Daltons and the maximal polymer mode is no greater than 90 weight percent of the multimodal polymer blend, wherein when said multimodal blend contains only ether linkages that said blend is not uniformly terminated with hydroxyl groups.

27. A composition comprising a multimodal sulfur containing polymer blend, said blend having a ratio of between 1.5 and 9.0 for a maximal polymer mode average molecular weight and a minimal polymer mode average molecular weight and the maximal polymer mode is no greater than 90% of the multimodal polymer blend.

* * * * *